(12) United States Patent
Okazaki et al.

(10) Patent No.: US 11,424,515 B2
(45) Date of Patent: Aug. 23, 2022

(54) BUS BAR MODULE

(71) Applicant: YAZAKI CORPORATION, Tokyo (JP)

(72) Inventors: Yutaro Okazaki, Kakegawa (JP); Shinichi Yanagihara, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 174 days.

(21) Appl. No.: 16/899,569

(22) Filed: Jun. 11, 2020

(65) Prior Publication Data

US 2020/0403207 A1    Dec. 24, 2020

(30) Foreign Application Priority Data

Jun. 18, 2019  (JP) .............................. JP2019-112849

(51) Int. Cl.
| | |
|---|---|
| *H01M 50/502* | (2021.01) |
| *H01M 50/531* | (2021.01) |
| *H01M 50/20* | (2021.01) |
| *H01R 11/28* | (2006.01) |

(52) U.S. Cl.
CPC ......... *H01M 50/502* (2021.01); *H01M 50/20* (2021.01); *H01M 50/531* (2021.01); *H01R 11/288* (2013.01)

(58) Field of Classification Search
CPC .. H01M 50/502; H01M 50/20; H01M 50/531; H01M 2220/20; H01R 11/288; Y02E 60/10
See application file for complete search history.

(56) References Cited

U.S. PATENT DOCUMENTS

| | | | | |
|---|---|---|---|---|
| 2004/0043663 | A1* | 3/2004 | Ikeda ................. | H01M 50/502 439/627 |
| 2011/0064987 | A1* | 3/2011 | Ogasawara ......... | H01M 50/502 174/68.2 |
| 2011/0076521 | A1* | 3/2011 | Shimizu ............. | H01M 50/529 429/82 |

(Continued)

FOREIGN PATENT DOCUMENTS

| | | | | |
|---|---|---|---|---|
| EP | 2461392 A2 | 6/2012 | | |
| JP | H07-130353 | * | 5/1995 | ............. H01M 2/34 |

(Continued)

OTHER PUBLICATIONS

Machine translation of JP H07-130353 (Year: 1995).*

*Primary Examiner* — Michael L Dignan
(74) *Attorney, Agent, or Firm* — Kenealy Vaidya LLP

(57) ABSTRACT

A bus bar includes a plurality of fastening holes in which a plurality of electrodes of a single cell is fastened with a nut, and a plurality of projections formed between the fastening holes and projecting in a direction away from the single cell. A case includes a bus bar hosing portion in which the bus bar is housed, and a support portion disposed in the projection of the bus bar housed in the bus bar housing portion and abutting against a back surface of the projection to support the bus bar. The support portion includes a base portion protruding in an arrangement direction of the fastening holes. At least a part of both side surfaces of the base portion overlaps with an inner side surface of the projection as viewed from a direction perpendicular to a fastening direction in which the bus bar is fastened to the electrode.

4 Claims, 7 Drawing Sheets

(56) References Cited

U.S. PATENT DOCUMENTS

| | | | | |
|---|---|---|---|---|
| 2015/0079447 | A1* | 3/2015 | Park | H01M 50/502 |
| | | | | 429/121 |
| 2017/0244091 | A1* | 8/2017 | Yuasa | H01G 11/82 |
| 2017/0288183 | A1* | 10/2017 | Sakai | H01M 50/502 |
| 2018/0277819 | A1* | 9/2018 | Kioschis | H01M 50/503 |

FOREIGN PATENT DOCUMENTS

| | | |
|---|---|---|
| JP | H07-130353 A | 5/1995 |
| JP | 2011-65863 A | 3/2011 |

* cited by examiner

BUS BAR MODULE

CROSS-REFERENCE TO RELATED APPLICATIONS

This application is based on and claims priority under 35 USC 119 from Japanese Patent Application No. 2019-112849 filed on Jun. 18, 2019, the contents of which are incorporated herein by reference.

TECHNICAL FIELD

The present invention relates to a bus bar module.

BACKGROUND ART

For example, a power supply device mounted on various vehicles which are an electric automobile that travels using an electric motor, a hybrid automobile that travels using an engine and an electric motor in combination, and the like includes a bus bar module including a bus bar connected to electrodes of a plurality of single cells of a battery assembly and a case that houses the bus bar and guides a routing path of an electric wire extending from the bus bar or the like (for example, see Patent Literature 1). The bus bar of the bus bar module is supported from below by a plate-shaped support portion provided in the case, and is fastened to the electrode of each single cell using a nut.

CITATION LIST

Patent Literature

Patent Literature 1: JP-A-2011-65863

SUMMARY OF INVENTION

When the bus bar module is assembled to the battery assembly, if a position of the support portion of the case is shifted with respect to the bus bar and the support of the bus bar becomes unstable, workability of fastening the bus bar to the electrode of the single cell is reduced. If the support portion is largely shifted with respect to the bus bar, the support portion may enter a part of the bus bar that is fastened to the electrode of the single cell, and a fastening state may become unstable.

The present invention has been made in view of the above-described circumstances. An aspect of the present invention provides a bus bar module in which a bus bar can be smoothly and stably fixed and electrically connected to an electrode of a single cell of a battery assembly.

In order to achieve the above-described aspect, a bus bar module according to the present invention is characterized by the following (1) to (3).
(1) A bus bar module including:
  a case that is assembled to a battery assembly formed of a plurality of single cells; and
  a bus bar that is supported by the case and that is formed of a conductive metal plate electrically connected to an electrode of the single cell of the battery assembly,
    in which the bus bar includes:
    a plurality of electrical connection portions configured to electrically connect and fix a plurality of the electrodes of the single cell; and
    a plurality of projections that are formed between the electrical connection portions and protrude in a direction away from the single cell,
  in which the case includes:
    a bus bar housing portion in which the bus bar is housed; and
    a support portion that is disposed in the projection of the bus bar housed in the bus bar housing portion and abuts against a back surface of the projection to support the bus bar, and
    in which the support portion includes a base portion protruding in an arrangement direction of the electrical connection portions, and at least a part of both side surfaces of the base portion overlaps with an inner side surface of the projection as viewed from a direction orthogonal to a connection direction in which the bus bar is connected and fixed to the electrode.
(2) The bus bar module according to (1),
  in which the base portion enters an inside of the projection, and a bottom surface of the projection opposite to a protruding surface of the projection is disposed at an upper side which is the protruding side of the projection with respect to a lower surface of the bus bar on a side that is connected and fixed to the electrode.
(3) The bus bar module according to (1) or (2),
  in which, in the bus bar, three or more electrical connection portions are formed at equal intervals, and the projections are formed between the electrical connection portions, respectively, and
  in which the case includes the support portion corresponding to each of the projections of the bus bar housed in the bus bar housing portion.

When the bus bar module having the above-described configuration (is assembled to the battery assembly, even if the support portion of the case is displaced relative to the bus bar, at least a part of the side surface of the base portion of the support portion abuts against the inner side surface of the projection of the bus bar, so that excessive displacement can be prevented. Accordingly, the electrical connection portion of the bus bar can be smoothly and stably fixed to the electrode of the single cell, and good connection reliability can be attained.

According to the bus bar module having the configuration (2), when the support portion of the case is displaced relative to the bus bar, the entire side surface of the base portion can reliably abut against the inner side surface of the projection of the bus bar, so that the excessive displacement can be prevented.

According to the bus bar module having the configuration (3), the excessive displacement relative to the bus bar can be reliably prevented by the base portions of the respective support portions configured to support the projections between the three or more electrical connection portions.

According to the present invention, it is possible to provide a bus bar module in which a bus bar can be smoothly and stably fixed and electrically connected to an electrode of a single cell of a battery assembly.

The present invention has been briefly described as above. Details of the present invention will be further clarified by reading a mode (hereinafter, referred to as an "embodiment") for carrying out the present invention described below with reference to the accompanying drawings.

BRIEF DESCRIPTION OF DRAWINGS

FIGS. 7A and 7B illustrate a reference example, in which FIG. 7A is a schematic cross-sectional view of a bus bar module, and FIG. 7B is a schematic cross-sectional view of the bus bar module in a state in which a position of a support portion of a case has been displaced relative to a bus bar.

DESCRIPTION OF EMBODIMENTS

Hereinafter, an embodiment of the present invention will be described with reference to the drawings.

Figure 1:
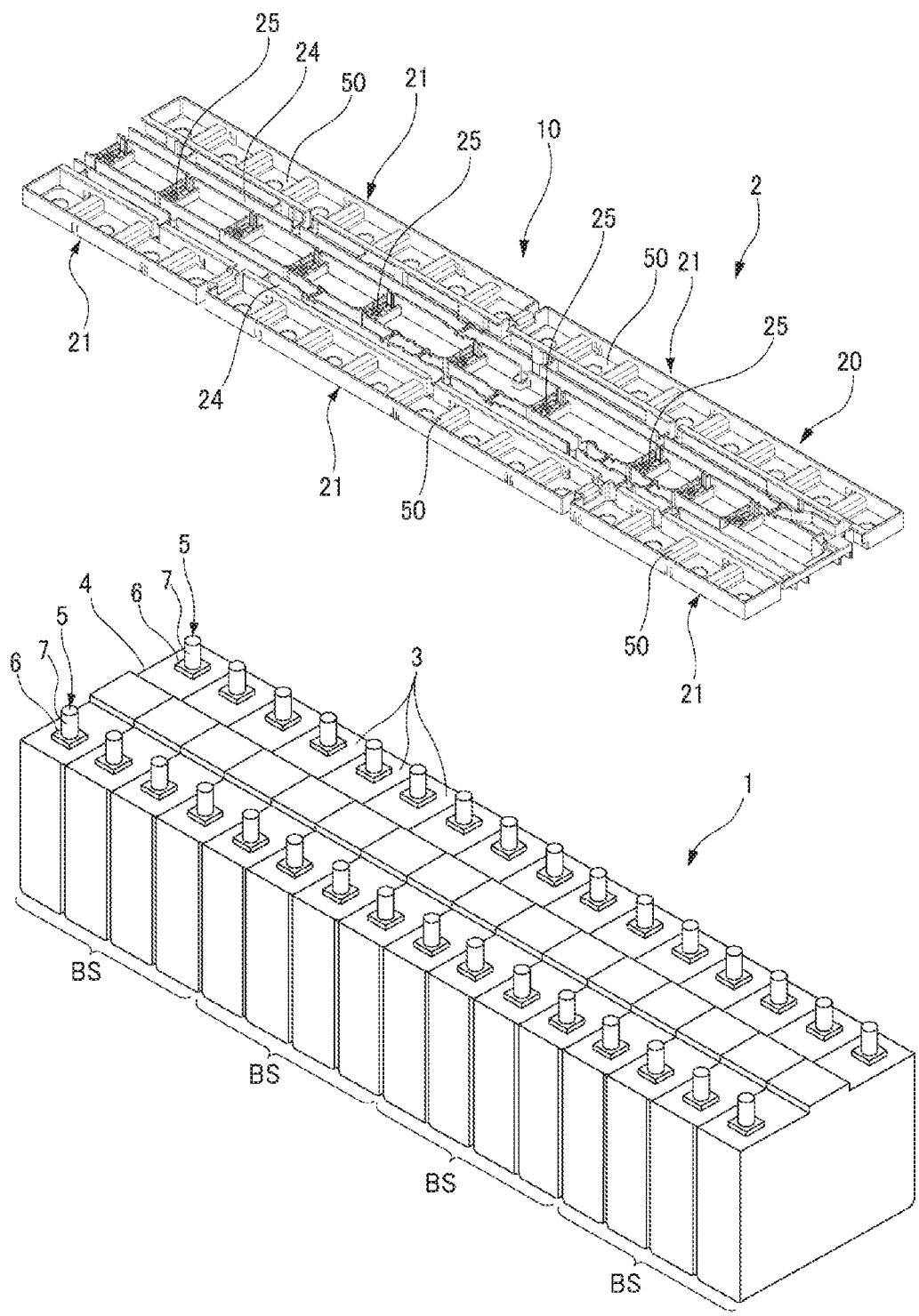
FIG. 1 is a perspective view of a bus bar module and a battery assembly according to an embodiment.

FIG. 1 is a perspective view of a bus bar module and a battery assembly according to the present embodiment.

As illustrated in FIG. 1, the bus bar module 10 according to the present embodiment is assembled to an upper part of a battery assembly 1 to form a power supply device 2. The power supply device 2 is mounted and used on various vehicles which are an electric automobile that travels using an electric motor, a hybrid automobile that travels using an engine and an electric motor in combination, and the like, and is configured to supply power to the electric motor.

The battery assembly 1 includes a plurality of single cells 3 that are arranged in a row along one direction and are fixed to one another. Each single cell 3 includes a rectangular parallelepiped battery body 4, and a pair of electrodes 5 protruding from near one end of an upper surface of the battery body 4 and from near the other end of the upper surface. One of the pair of electrodes 5 is a positive electrode and the other is a negative electrode.

The single cells 3 are arranged such that the battery bodies 4 are in contact with one another. In the battery assembly 1, poles of the electrodes 5 are aligned for every four single cells 3 adjacent to one another, and one battery set BS is formed of the four single cells 3 in which the poles of the electrode 5 are aligned. In this example, the battery assembly 1 includes four battery sets BS each including four single cells 3, and the battery sets BS of the single cells 3 that are adjacent to one another are arranged such that the poles of the electrodes 5 are alternated.

Each of the pair of electrodes 5 is formed of a conductive metal. The electrode 5 includes a plate-shaped seat plate portion 6 and a columnar pole post 7 erected at a center of the seat plate portion 6. A male screw is formed on an outer periphery of the pole post 7, and a nut 60 (described below) is fastened thereto.

Figure 2:
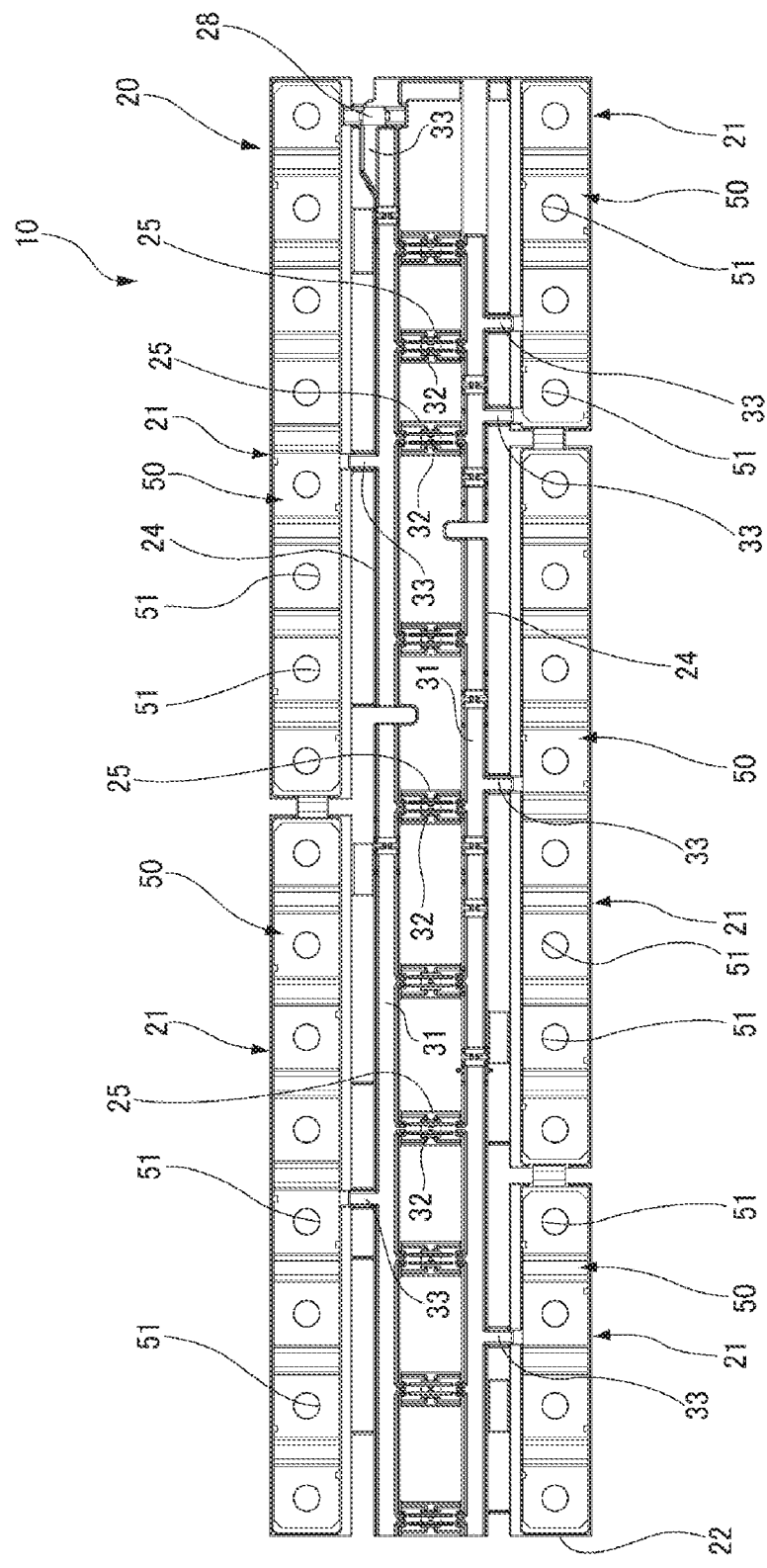
FIG. 2 is a top view of the bus bar module according to the present embodiment.

FIG. 2 is a top view of the bus bar module according to the present embodiment.

As illustrated in FIG. 2, the bus bar module 10 includes a case 20 and a bus bar 50. The bus bar module 10 connects the battery sets BS of the single cells 3 in series.

The case 20 is integrally formed of, for example, a synthetic resin or the like, and includes a plurality of bus bar housing portions 21.

The bus bar housing portions 21 are arranged in two rows along an arrangement direction of the plurality of single cells 3. The bus bar housing portion 21 is formed of a frame including a peripheral wall portion 22, and the bus bar 50 is housed in the bus bar housing portion 21.

The case 20 includes two support beam portions 24 along the arrangement of the bus bar housing portions 21, and the bus bar housing portions 21 are connected to and supported by the support beam portions 24, respectively. The two support beam portions 24 are connected in parallel by bridge portions 25.

One of the support beam portions 24 is provided with an electric wire routing groove portion 31. The electric wire routing groove portion 31 is formed in a gutter shape with an upper side thereof opened. A thermistor mounting portion 28 is formed at an end of the other support beam portion 24, and a thermistor (not illustrated) configured to detect a temperature of the single cell 3 is mounted on the thermistor mounting portion 28.

The bridge portion 25 connecting the support beam portions 24 is provided with a gutter-shaped electric wire routing groove portion 32 whose upper side is opened, and the electric wire routing groove portion 32 is provided continuously with the electric wire routing groove portion 31.

The bus bar housing portion 21 and the thermistor mounting portion 28 are provided continuously with gutter-shaped electric wire routing groove portions 33 whose upper sides are opened. The electric wire routing groove portion 33 provided continuously with the bus bar housing portion 21 in one row is provided continuously with the electric wire routing groove portion 31 of the one of support beam portions 24, and the electric wire routing groove portion 33 provided continuously with the bus bar housing portion 21 in the other row and the thermistor mounting portion 28 is provided continuously with the electric wire routing groove portion 32 of the bridge portion 25.

The electric wire routing groove portions 31, 32, 33 of the case 20 house an electric wire (not illustrated) for voltage detection electrically connected to the bus bar 50 and an electric wire (not illustrated) extending from the thermistor. These electric wires are led out from an end of the electric wire routing groove portion 31 of the one of the support beam portions 24, and are connected to a circuit board (not illustrated) including a voltage monitoring circuit and a temperature monitoring circuit.

Figure 3:
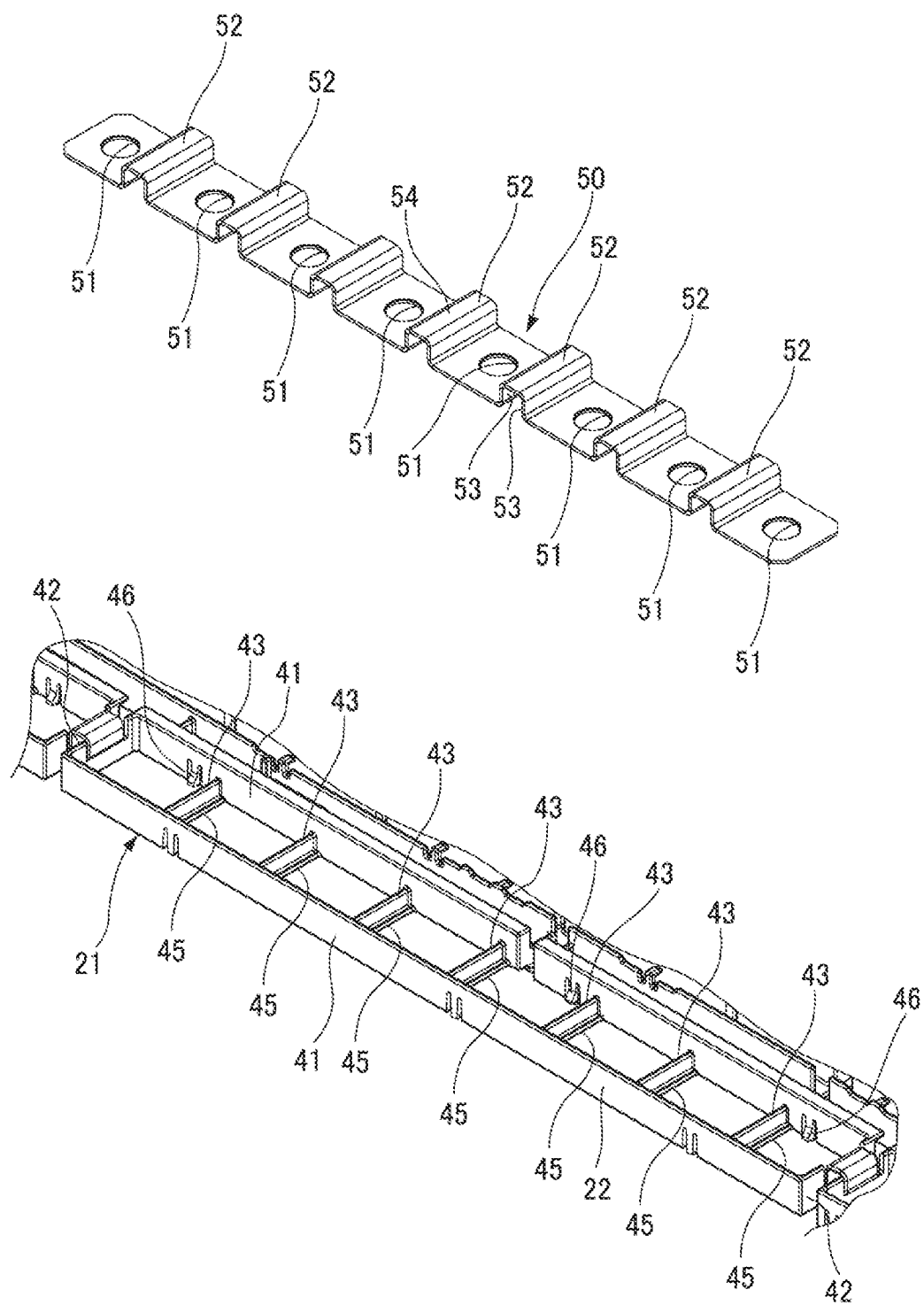
FIG. 3 is a perspective view of a bus bar housing portion and a bus bar.
Figure 4:
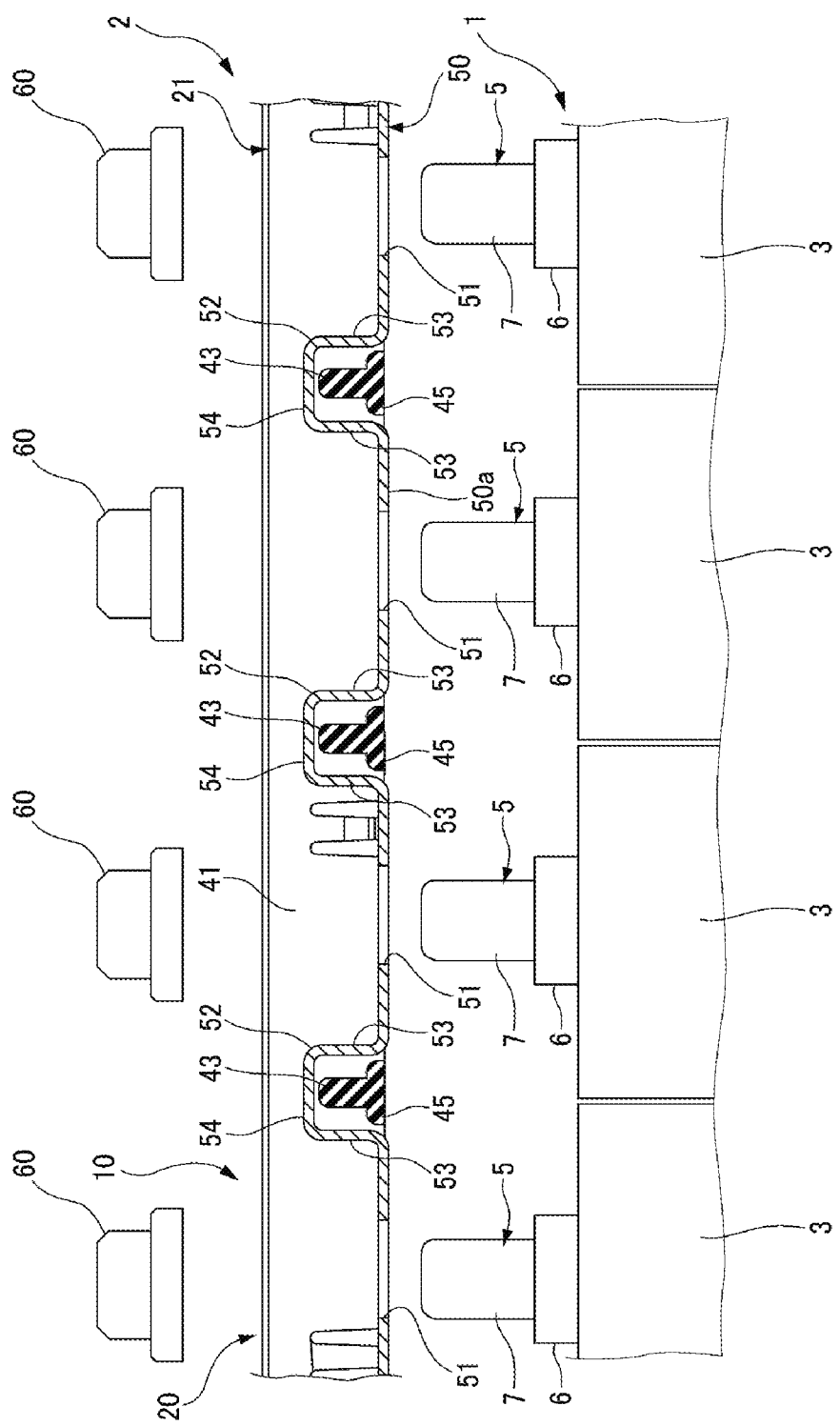
FIG. 4 is a cross-sectional view of the bus bar module that is fastened and assembled to an electrode of a single cell of the battery assembly by a nut.
Figure 5:
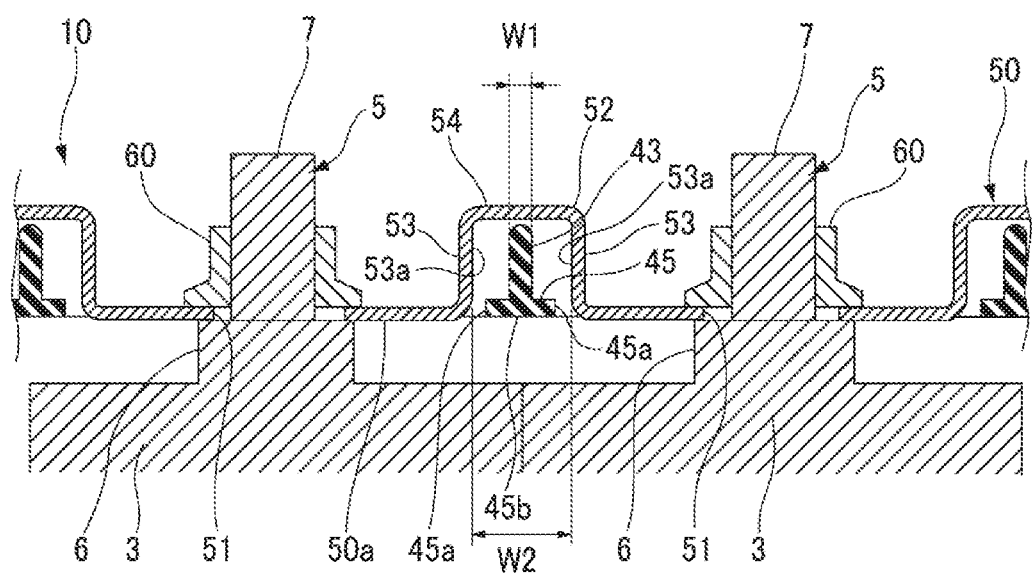
FIG. 5 is a schematic cross-sectional view of the bus bar module that is fastened and assembled to the electrode of the single cell of the battery assembly.

FIG. 3 is a perspective view of a bus bar housing portion and a bus bar. FIG. 4 is a cross-sectional view of the bus bar module that is fastened and assembled to an electrode of a single cell of the battery assembly by a nut. FIG. 5 is a schematic cross-sectional view of the bus bar module that is fastened and assembled to the electrode of the single cell of the battery assembly.

As illustrated in FIGS. 3 to 5, the bus bar 50 housed in the bus bar housing portion 21 of the case 20 is formed to be long. The bus bar 50 is formed by punching and bending a conductive metal plate. The bus bar 50 is formed with a plurality of fastening holes 51 as electrical connection portions. These fastening holes 51 are formed at the same pitch as a pitch of the electrodes 5 along the arrangement direction of the single cells 3 of the battery assembly 1. The fastening hole 51 has an inner diameter slightly larger than an outer diameter of the pole post 7 of the electrode 5. The pole posts 7 of the electrodes 5 are inserted through the fastening holes 51. The nut 60 is screwed and fastened to the pole post 7 of the electrode 5 passed through the fastening hole 51 of the bus bar 50. Accordingly, an edge of the fastening hole 51 in the bus bar 50 is fastened (fixed) while being interposed between the seat plate portion 6 of the electrode 5 and the nut 60, and the bus bar 50 and the electrode 5 are electrically connected.

The bus bar 50 includes a projection 52 between the adjacent fastening holes 51. The projection 52 is formed in a convex shape protruding upward, and includes a pair of side plate portions 53 facing each other and an upper plate portion 54 provided continuously with upper edges of the side plate portions 53.

The bus bar housing portion 21 formed of the frame that houses the bus bar 50 includes a pair of long side portions 41 and a pair of short side portions 42, and the short side portion 42 is provided continuously with both ends of the long side portion 41. The bus bar housing portion 21 includes a plurality of support portions 43. The support portions 43 are integrally formed being bridged over the long side portions 41, and are provided at intervals in a longitudinal direction of the bus bar housing portion 21.

The support portion 43 is formed in a plate shape, and an upper edge thereof is formed in an arc shape as viewed in cross section. The support portion 43 extends in a direction orthogonal to an arrangement direction of the fastening holes 51 of the bus bar 50 housed in the bus bar housing portion 21. The support portion 43 is erected on a base portion 45 formed in a plate shape. The base portion 45 is formed integrally at a lower edge of the support portion 43 while protruding to both sides. The support portion 43 is formed narrower than the base portion 45. A width W1 of the support portion 43 is smaller than an interval W2 between inner side surfaces of the side plate portions 53 of the projection 52 formed on the bus bar 50.

The support portion 43 is provided inside the projection 52 of the bus bar 50 substantially below a center of the projection 52 in a state in which the bus bar 50 is housed in the bus bar housing portion 21 from above. The support portion 43 abuts against a back surface of the upper plate portion 54 of the projection 52 to support the bus bar 50. As illustrated in FIG. 5, in the state in which the bus bar 50 is housed in the bus bar housing portion 21, the base portion 45 enters the inside of the projection 52. The bottom surface 45b opposite to a protruding side of the projection 52 is provided at an upper side, which is the protruding side of the projection 52, with respect to a lower surface 50a of the bus bar 50 on a side that is fastened to the electrode 5. Accordingly, in the state in which the bus bar 50 is housed in the bus bar housing portion 21, both side surfaces 45a of the base portion 45 of the support portion 43 overlaps inner side surfaces 53a of the projection 52 as viewed from a direction orthogonal to a direction in which the bus bar 50 is fastened to the electrode 5.

The bus bar housing portion 21 includes a plurality of locking claws 46 on the long side portion 41. When the bus bar 50 has been housed in the bus bar housing portion 21 from above, a periphery of the bus bar 50 is locked by the locking claws 46. Accordingly, the bus bar 50 is prevented from falling out of the bus bar housing portion 21 in a state in which the projection 52 of the bus bar 50 is supported by the support portion 43.

In order to assemble the bus bar module 10 having the above-described structure to the battery assembly 1, the bus bar module 10 is placed on the upper part of the battery assembly 1, and the pole post 7 of the electrode 5 of the single cell 3 is inserted into the fastening hole 51 of the bus bar 50.

Next, the nut 60 is screwed and fastened to the pole post 7 of the electrode 5 inserted into the fastening hole 51 of the bus bar 50.

Accordingly, the edge of the fastening hole 51 in the bus bar 50 is interposed between the seat plate portion 6 of the electrode 5 and the nut 60, and the bus bar 50 and the electrode 5 are electrically connected.

When the bus bar module 10 is assembled to the battery assembly 1, the support portion 43 of the case 20 may be displaced relative to the bus bar 50.

Figure 6:
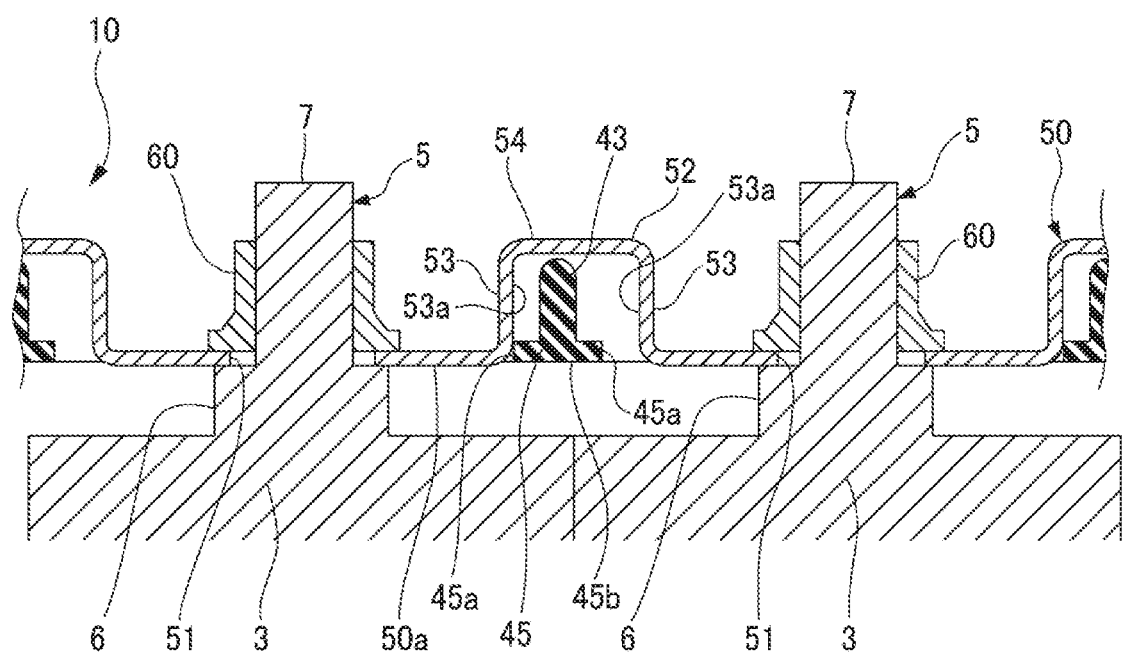
FIG. 6 is a schematic cross-sectional view of the bus bar module illustrating a state in which a position of a support portion of a case has been displaced relative to the bus bar.

However, in the bus bar module 10 according to the present embodiment, as illustrated in FIG. 6, the side surface 45a of the base portion 45 formed in the support portion 43 abuts against the inner side surface 53a of the side plate portion 53 of the projection 52 of the bus bar 50, so that excessive displacement can be prevented.

Figure 7A:
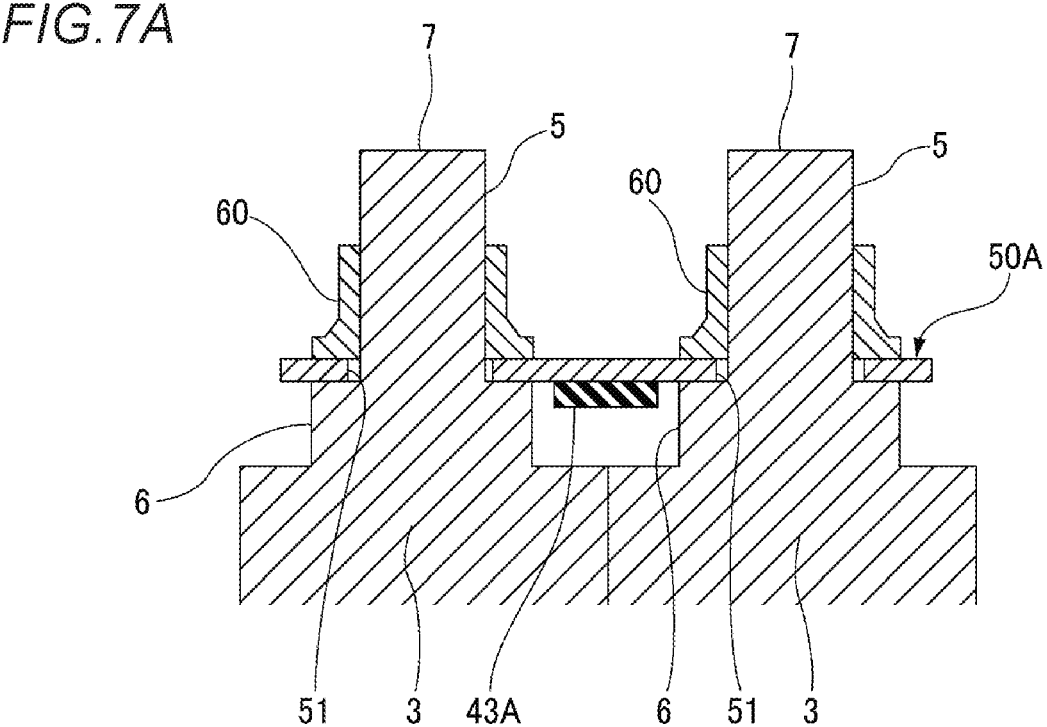

Here, as illustrated in FIG. 7A, a flat bus bar 50A not including the projection 52 is fastened to the electrode 5 of the single cell 3, and the lower surface 50a of the bus bar 50 is supported by a plate-shaped support portion 43A between the fastening holes 51.

Figure 7B:
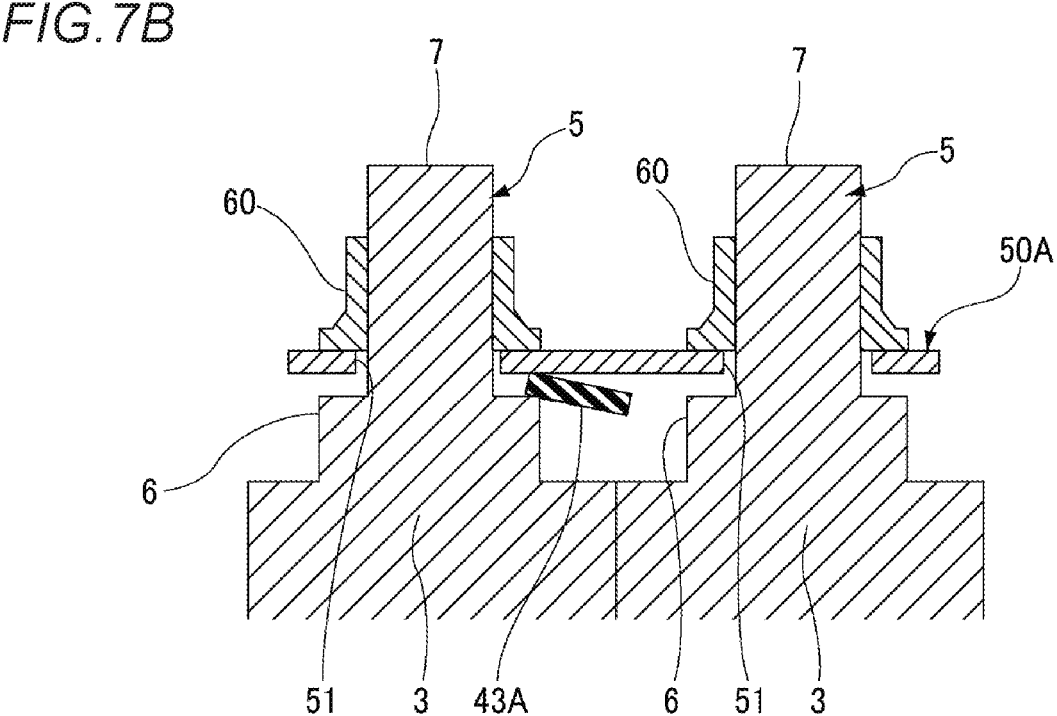

In this structure, when the support portion 43A is displaced relative to the bus bar 50A in a plane direction, the displacement cannot be prevented. Therefore, as illustrated in FIG. 7B, when the displacement is large, an edge of the support portion 43A enters a fastening part between the bus bar 50 and the seat plate portion 6 of the electrode 5, and a fastening state may become unstable.

On the other hand, when the bus bar module 10 according to the present embodiment is assembled to the battery assembly 1, even if the support portion 43 of the case 20 is displaced relative to the bus bar 50, as described above, the side surface 45a of the base portion 45 of the support portion 43 abuts against the inner side surface 53a of the projection 52 of the bus bar 50, so that the excessive displacement can be prevented (see FIG. 6). Accordingly, the bus bar 50 can be smoothly and stably fastened to the electrode 5 of the single cell 3 by the nut 60, and good connection reliability can be attained.

In addition, the base portion 45 enters the inside of the projection 52, and the bottom surface 45b opposite to the protruding side of the projection 52 is provided at the protruding side of the projection 52 with respect to the lower surface 50a of the bus bar 50 housed in the bus bar housing portion 21 on the side that is fastened to the electrode 5. Therefore, when the support portion 43 of the case 20 is displaced relative to the bus bar 50, the entire side surface 45a of the base portion 45 can reliably abut against the inner side surface 53a of the projection 52 of the bus bar 50, so that the excessive displacement can be prevented.

The excessive displacement relative to the bus bar 50 can be reliably prevented by the base portions 45 of the respective support portions 43 configured to support the projections 52 between the three or more fastening holes 51.

The present invention is not limited to the above-described embodiment, and may be appropriately modified, improved, or the like. In addition, materials, shapes, sizes, numbers, arrangement positions, and the like of components in the above-described embodiment are optional as long as the present invention can be achieved, and the present invention is not limited thereto.

For example, in the above-described bus bar 50 according to the embodiment, a case has been described as an example in which the fastening holes 51 are formed as a plurality of electrical connection portions configured to electrically connect and fix the plurality of electrodes 5 of the single cells 3, and the nut 60 is screwed to be fastened and fixed to the pole post 7 of the electrode 5 passed through the fastening hole 51. It is needless to say that the electrical connection portion of the bus bar according to the present invention is not limited thereto, and may be a welded portion that is fixed to the electrode by welding.

Here, characteristics of the embodiment of the bus bar module according to the present invention described above are summarized briefly in the following [1] to [3], respectively.

[1] A bus bar module including:
a case (20) that is assembled to a battery assembly (1) formed of a plurality of single cells (3); and
a bus bar (50) that is supported by the case (20), and that is formed of a conductive metal plate electrically connected to an electrode (5) of the single cell (3) of the battery assembly (1),
in which the bus bar (50) includes:
a plurality of electrical connection portions (fastening holes 51) configured to electrically connect and fix a plurality of the electrodes (5) of the single cell (3); and
a plurality of projections (52) that are formed between the electrical connection portions (the fastening holes 51) and protrude in a direction away from the single cell (3),
in which the case (20) includes:
a bus bar housing portion (21) in which the bus bar (50) is housed; and
a support portion (43) that is provided in the projection (52) of the bus bar (50) housed in the bus bar housing portion (21) and abuts against a back surface of the projection (52) to support the bus bar (50), and
in which the support portion (43) includes a base portion (45) protruding in an arrangement direction of the electrical connection portions (the fastening holes 51), and at least a part of both side surfaces (45*a*) of the base portion (45) overlaps with an inner side surface (53*a*) of the projection (52) as viewed from a direction orthogonal to a direction in which the bus bar (50) is connected and fixed to the electrode (5).

[2] The bus bar module according to [1],
in which the base portion (45) enters an inside of the projection (52), and a surface (a bottom surface 45*b*) opposite to a protruding surface of the projection (52) is provided at the protruding side of the projection (52) with respect to a surface (a lower surface 50*a*) of the bus bar (50) on a side that is connected and fixed to the electrode (5).

[3] The bus bar module according to [1],
in which, in the bus bar (50), three or more electrical connection portions (the fastening holes 51) are formed at equal intervals, and the projections (52) are formed between the electrical connection portions (the fastening holes 51), respectively, and
in which the case (20) includes the support portion (43) corresponding to each of the projections (52) of the bus bar (50) housed in the bus bar housing portion (21).

What is claimed is:
1. A bus bar module comprising:
a case that is assembled to a battery assembly formed of a plurality of single cells; and
a bus bar that is supported by the case and that is formed of a conductive metal plate,
wherein the bus bar includes:
a plurality of electrical connection portions configured to electrically connect and fix a plurality of the electrodes of the single cells; and
a plurality of projections that are formed between the electrical connection portions and protrude in a direction away from the single cells,
wherein the case includes:
a bus bar housing portion in which the bus bar is housed; and
a support portion that is disposed in a respective one of the projections of the bus bar housed in the bus bar housing portion and abuts against a back surface of the respective one of the projections to support the bus bar, and
wherein the support portion includes a base portion protruding in an arrangement direction of the electrical connection portions, and at least a part of both side surfaces of the base portion overlaps with inner side surfaces of the respective one of the projections as viewed from a direction perpendicular to a connecting direction in which the bus bar is connected and fixed to the electrode,
wherein both side surfaces of the base portion are perpendicular to a bottom portion of the base portion,
wherein the inner side surfaces of the one of the projections are perpendicular to the bottom portion of the base portion, and
wherein the part of one of the side surfaces of the base portion abuts the inner side surface of the respective one of the projections in the arrangement direction.

2. The bus bar module according to claim 1,
wherein the bus bar includes a lower surface that abuts and is fixed to the electrode of each of the single cells, and
wherein the base portion enters an inside of the respective one of the projections, the projection includes a protruding surface, and the base portion includes the bottom surface that is opposite to the protruding surface, and the bottom surface of the base portion is disposed above the lower surface of the bus bar in the direction the respective one of the projections protrudes away from the single cells.

3. The bus bar module according to claim 1,
wherein three or more electrical connection portions are formed at equal intervals in the bus bar, and the projections are formed between the electrical connection portions in the bus bar, respectively, and
wherein the case includes the support portion corresponding to each of the projections of the bus bar housed in the bus bar housing portion.

4. The bus bar module according to claim 1,
wherein the projection includes a pair of side plate portions facing each other, and an upper plate portion provided continuously with upper edges of the side plate portions and disposed perpendicular to the side plate, and
wherein the support portion abuts against a back surface of the upper plate portion of the projection.

* * * * *